United States Patent
Chen

(10) Patent No.: US 8,381,759 B1
(45) Date of Patent: Feb. 26, 2013

(54) FAUCET HANDLE ASSEMBLY MECHANISM

(75) Inventor: Frank Kee-Suo Chen, Changhua (TW)

(73) Assignee: Crescent Plumbing, Inc., Shianshi Shang, Changhua (TW)

( * ) Notice: Subject to any disclaimer, the term of this patent is extended or adjusted under 35 U.S.C. 154(b) by 555 days.

(21) Appl. No.: 12/695,621

(22) Filed: Jan. 28, 2010

(51) Int. Cl.
*F16K 51/00* (2006.01)

(52) U.S. Cl. .................. 137/315.15; 251/292; 251/297

(58) Field of Classification Search ............ 137/315.11–315.15; 251/291–292; 4/675–648; 403/109.3; 74/527–542, 548–551
See application file for complete search history.

(56) References Cited

U.S. PATENT DOCUMENTS

| | | | | |
|---|---|---|---|---|
| 4,519,581 A | * | 5/1985 | Paul | 251/268 |
| 4,813,455 A | * | 3/1989 | Iqbal | 137/625.17 |
| 4,842,009 A | * | 6/1989 | Reback | 137/315.15 |
| 4,961,443 A | * | 10/1990 | Buccicone et al. | 137/315.15 |
| 6,438,771 B1 | * | 8/2002 | Donath et al. | 4/678 |
| 6,729,604 B1 | * | 5/2004 | Claycomb | 254/217 |
| 7,331,358 B2 | * | 2/2008 | Gallina et al. | 137/315.15 |
| 8,079,287 B2 | * | 12/2011 | Castillo | 74/553 |
| 2003/0177872 A1 | * | 9/2003 | Shu-Ying et al. | 81/63.2 |
| 2004/0026648 A1 | * | 2/2004 | Heimann et al. | 251/292 |
| 2004/0084501 A1 | * | 5/2004 | Lin | 227/120 |

* cited by examiner

*Primary Examiner* — Eric Keasel
*Assistant Examiner* — R. K. Arundale
(74) *Attorney, Agent, or Firm* — Egbert Law Offices, PLLC

(57) ABSTRACT

A faucet apparatus has a bolt assembly with a brake shaft lever extending therefrom, a handle lever, and a handle holder lock having one end affixed to the handle lever, a handle holder having an axial hole extending therethrough, and a handle lever assembly positioned in the axial hole. The handle lever is connected to the brake shaft lever. The handle lever assembly is sleeved over the handle holder lock. An elastic locker is positioned in a radial slot of the handle holder lock so as to engage with a notch in the handle lever assembly.

2 Claims, 5 Drawing Sheets

FAUCET HANDLE ASSEMBLY MECHANISM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an assembly mechanism for a faucet handle, and more particularly to an innovative one which permits simple and rapid assembly and also improves the overall aesthetic effect and value.

2. Description of Related Art

Including Information Disclosed Under 37 CFR 1.97 and 37 CFR 1.98.

Coupled with the growing living standard and lifestyle of the general public, a full range of faucet products have been developed to meet their various consumption demands.

The present invention aims to improve the assembly and positioning mechanism of the faucet handle, of which said faucet handle is generally fixed onto the bolt assembly of the faucet to control its water outflow state.

However, a conventional faucet handle comprises structurally a handle and a handle holder, of which the handle and handle holder are mostly assembled by means of bolting. Such a positioning structure brings about inconvenient and time-consuming removal and assembly, but also affects the aesthetic effect and sense of value due to exposure of the bolt head.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production, development and design of related products.

BRIEF SUMMARY OF THE INVENTION

Based on the unique configuration of the "improved assembly mechanism of the faucet handle" of the present invention that the assembly state of the handle lever and handle holder of the faucet handle can be fixed by the elastic locker. Said elastic locker of the present invention is formed onto the handle holder lock correspondingly to the handle lever assembly as compared with prior art. With this configuration, the assembly state of the handle lever and handle holder can be fixed by the elastic locker, thereby realizing simple and rapid assembly, and improving the overall aesthetic effect and value of the faucet handle.

The improvements brought about by this invention are as follows:

Since the positioning tooth edges of the handle holder lock and handle lever assembly are mated with each other for flexible adjustment of the preset angles, the handle lever of variable angles can be adapted to meet diversified user demands with improved applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
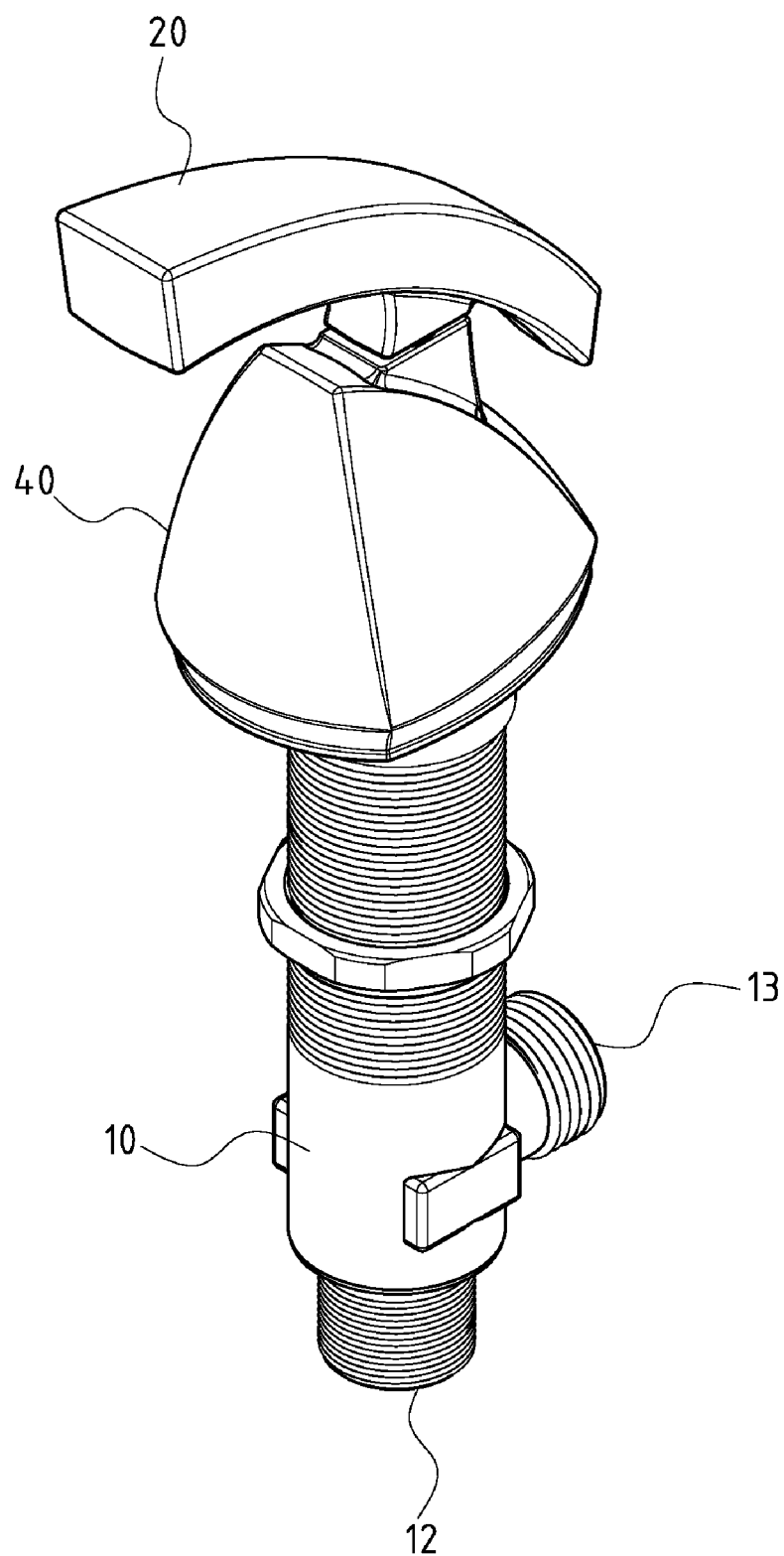
FIG. 1 shows a perspective view of the assembled present invention.

FIGS. 1-4 depict preferred embodiments of an assembly mechanism of faucet handle of the present invention, which are provided for only explanatory objective for patent claims. Said faucet handle is mounted onto one end of the brake shaft lever 11 of a bolt assembly 10. The bolt assembly 10 is provided with a water inlet 12 and a water outlet 13. Said faucet handle includes a handle lever 20, fitted with a coupling end 21.

A handle holder lock 30 is fitted with a locking end 31 for assembly onto the coupling end 21 of the handle lever 20. A handle holder 40 has an axial hole 41 and a handle lever assembly 42, of which the axial hole 41 is used for insertion of the coupling end 21 of the handle lever 20, and the handle holder lock 30 is mated with the handle lever assembly 42. The handle holder 40 includes a handle pedestal 44 set on the bottom of the handle holder 40, and is provided with a through-hole 441 to be sleeved onto the bolt assembly 10. Moreover, it is coupled with the bolt assembly 10 via a fixture 45. Said handle lever assembly 42 is coupled with one end of the brake shaft lever 11 of the bolt assembly 10.

At least one elastic locker 50 is set onto the handle holder lock 30 correspondingly to the handle lever assembly 42, and used to limit securely the assembly state of the handle lever 20 and handle holder 40.

Of which, said handle holder lock 30 is configured into either of a cylinder or round rod, such that the handle lever assembly 42 is configured correspondingly into a round rod or cylinder for sleeving purpose. The handle holder lock 30 of the present invention is configured into around rod, whilst the handle lever assembly 42 is configured into a cylinder (as shown in FIG. 2).

Figure 4:
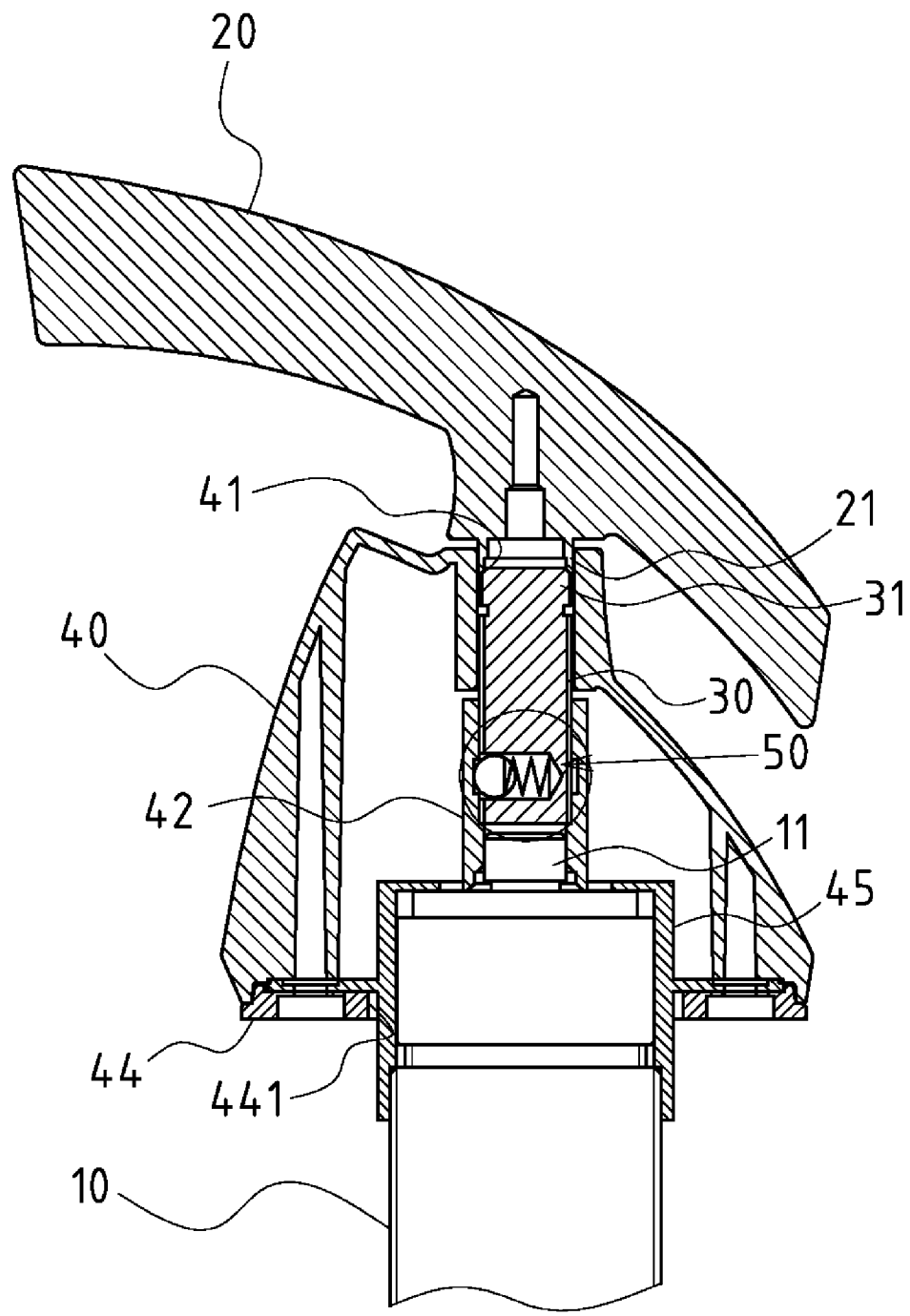
FIG. 4 shows a cross sectional view of the assembled present invention.
Figure 5:
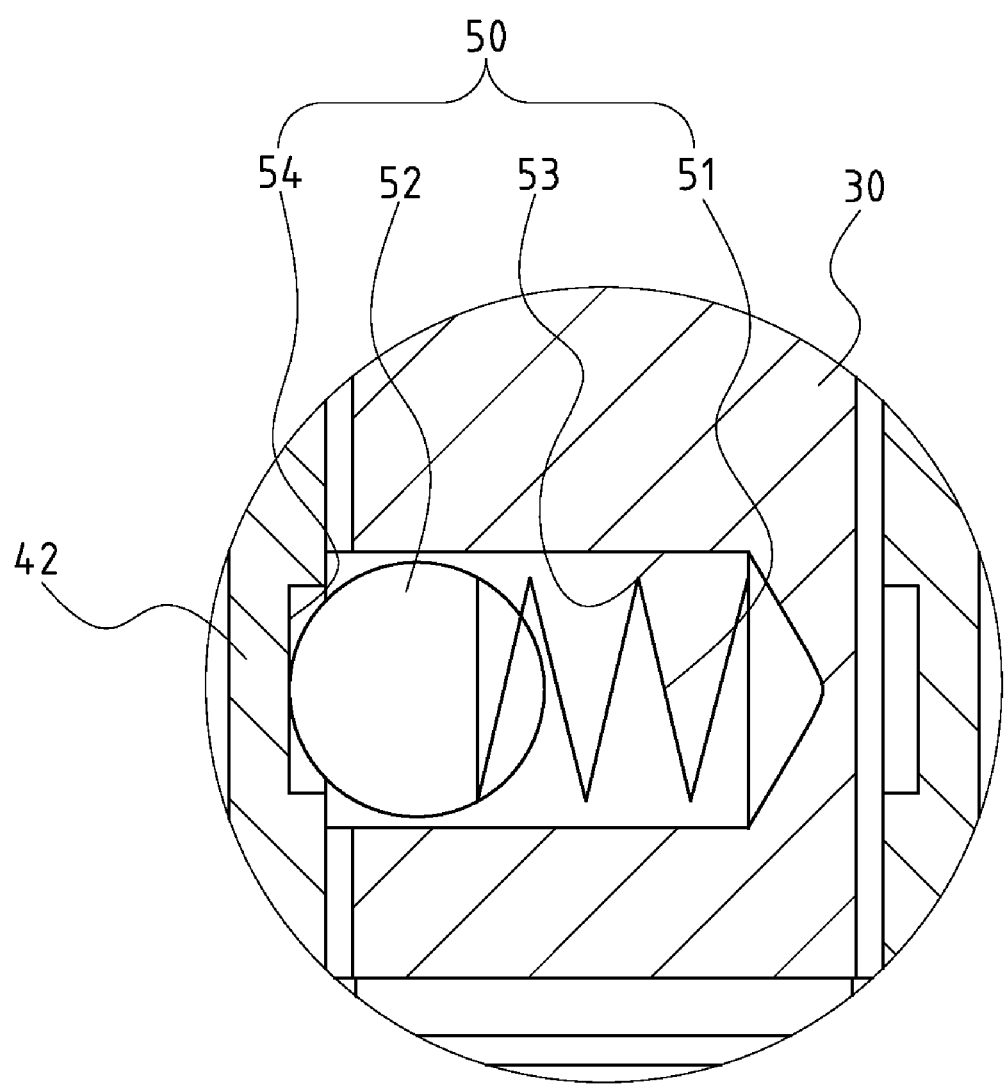
FIG. 5 shows a partially enlarged view of FIG. 4.

Referring to FIGS. 4 and 5, the elastic locker 50 includes an elastic supporting member 51, a bead 52, a radial slot 53 and a stopping portion 54. The elastic supporting member 51 is set within the radial slot 53, whilst the bead 52 is supported by the elastic supporting member 51 to pop up elastically, and limited by the stopping portion 54. The radial slot 53 is formed into either of the rodlike handle holder lock 30 or handle lever assembly 42. The stopping portion 54 is formed correspondingly into the cylindrical handle lever assembly 42 or handle holder lock 30. The radial slot 53 of the present invention is formed at one side of the handle holder lock 30, and the stopping portion 54 is set correspondingly onto the inner wall of the handle lever assembly 42.

Figure 2:
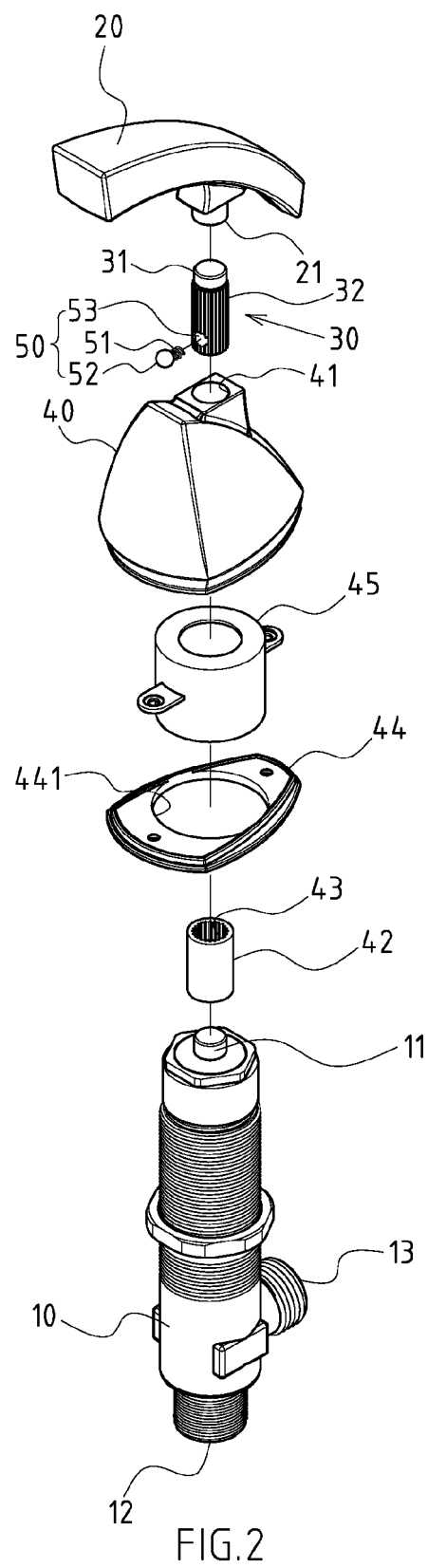
FIG. 2 shows an exploded perspective view of the present invention.
Figure 3:
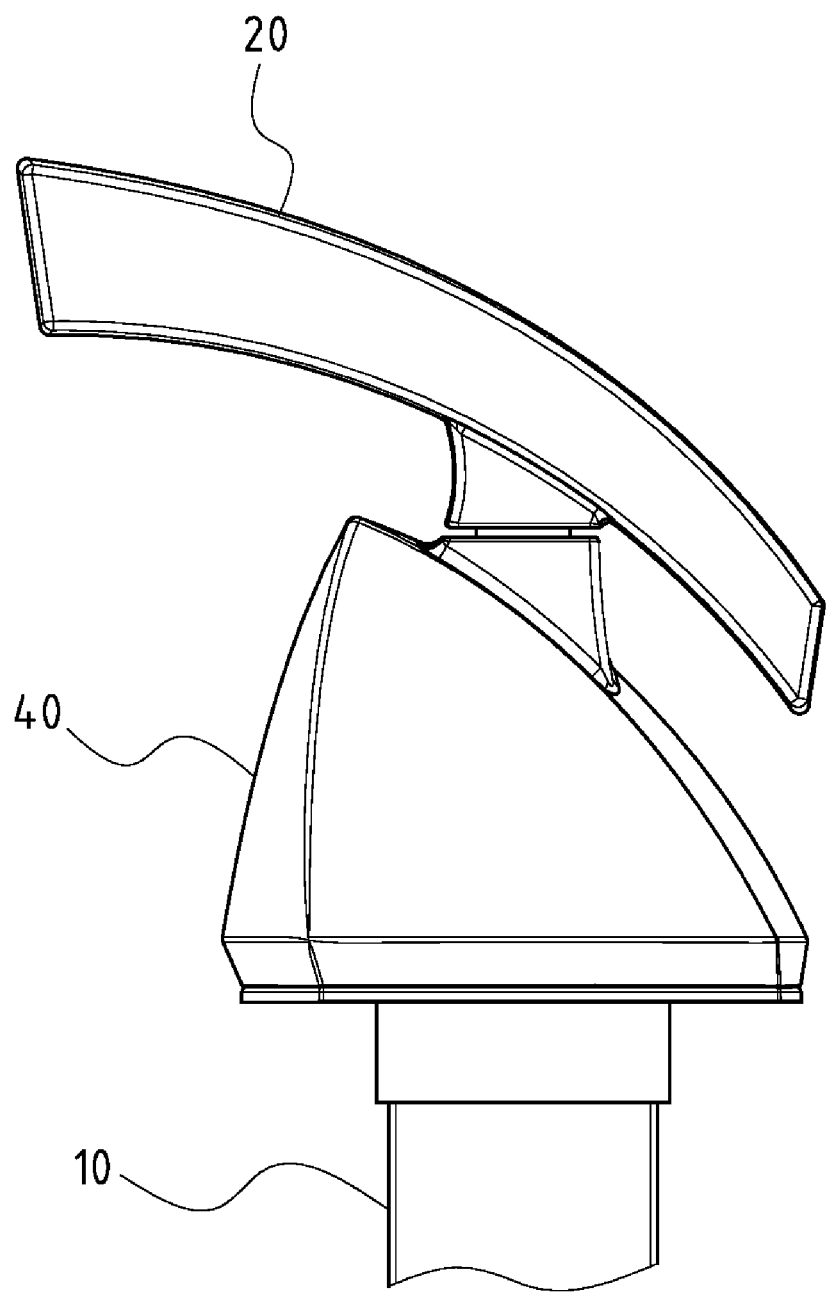
FIG. 3 shows a plan view of the assembled present invention.

Of which, positioning tooth edges 32, 43 are formed correspondingly onto the handle holder lock 30 and the handle lever assembly 42; the positioning tooth edge 32 of the handle holder lock 30 is formed on the periphery of the rodlike handle holder lock 30, and the positioning tooth edge 43 of the handle lever assembly 42 formed on the inner wall of the cylindrical handle lever assembly 42 (shown in FIG. 2). With this configuration, the positioning tooth edges 32, 43 are mated with each other for flexible adjustment of the preset angles, so that the handle lever 20 of variable angles can be adapted to meet diversified user demands.

Based on the aforementioned structural configuration, the core feature of the faucet handle's assembly mechanism of the present invention lies in that, the handle lever 20 and handle holder 40 of the faucet handle are assembled fixedly by said elastic locker 50. The elastic locker 50 is formed onto the handle holder lock 30 correspondingly to the handle lever assembly 42, enabling the handle lever 20 of the faucet handle and the handle holder lock 30 to be inserted directly into the handle lever assembly 42 of the handle holder 40. Also, the assembly state of the handle lever 20 and handle holder 40 can be fixed by the elastic locker 50 (shown in FIG. 4), thereby realizing simple and rapid assembly, and improving the overall aesthetic effect and value of the faucet handle.

I claim:

1. A faucet apparatus comprising: a bolt assembly having a brake shaft lever extending from an end thereof, said bolt assembly having an inlet and an outlet; a handle lever having a coupling end; a handle holder lock having a locking end affixed to said coupling end of said handle lever, said handle holder lock having teeth formed on an exterior surface thereof and extending longitudinally therealong, said handle holder lock having a radial slot formed therein so as to open at said exterior surface; a handle holder having an axial hole extending therethrough; a handle lever assembly positioned in said axial hole of said handle holder, said handle lever assembly connected to said brake shaft lever of said bolt assembly, said handle lever assembly having an interior passageway, said handle lever assembly having teeth formed on a wall of said interior passageway, said handle holder lock positioned in said interior passageway such that said teeth of said handle holder lock mesh with said teeth in said interior passageway of said handle lever assembly, said wall of said interior passageway of said handle lever assembly having a notch formed therein; and an elastic locker assembly positioned in said radial slot of said handle holder lock so as to releasably engage said notch of said handle lever assembly, said elastic locker assembly comprising: an elastic supporting member positioned so as to extend along at least a portion of said radial slot of said handle holder lock; and a bead positioned against said elastic supporting member and positioned within said radial slot, said elastic supporting member bearing against said bead so as to urge said bead into said notch.

2. The faucet apparatus of claim 1, said handle holder lock having a generally cylindrical configuration, said handle lever assembly having a generally cylindrical configuration sleeved onto said handle holder lock.

* * * * *